(12) United States Patent
Wood (10) Patent No.: US 9,068,560 B2
(45) Date of Patent: Jun. 30, 2015

(54) ENERGY GENERATION SYSTEM INCLUDING PRESSURE VESSELS WITH FLEXIBLE BLADDERS HAVING ELONGATE VALVE TUBES CONTAINED THEREIN THAT CONTAIN A PLURALITY OF FLOW APERTURES FOR COMMUNICATION OF FLUID THEREWITH

(75) Inventor: Richard Roy Wood, Randburg (ZA)

(73) Assignee: ERLS Mining (Pty) Ltd, Mulbarton (ZA)

( * ) Notice: Subject to any disclaimer, the term of this patent is extended or adjusted under 35 U.S.C. 154(b) by 363 days.

(21) Appl. No.: 13/123,165

(22) PCT Filed: Oct. 7, 2009

(86) PCT No.: PCT/ZA2009/000088
§ 371 (c)(1),
(2), (4) Date: May 16, 2011

(87) PCT Pub. No.: WO2010/042961
PCT Pub. Date: Apr. 15, 2010

(65) Prior Publication Data
US 2011/0214424 A1    Sep. 8, 2011

(30) Foreign Application Priority Data

Oct. 7, 2008 (ZA) .................................. 2008/08520
Jan. 29, 2009 (ZA) .................................. 2009/00714

(51) Int. Cl.
*F03G 7/00* (2006.01)
*E21F 17/00* (2006.01)

(52) U.S. Cl.
CPC .. *F03G 7/00* (2013.01); *E21F 17/00* (2013.01)

(58) Field of Classification Search
CPC ................................. E21F 3/00; F04B 47/08
USPC ........ 417/395; 60/639, 761; 601/149; 138/30
See application file for complete search history.

(56) References Cited

U.S. PATENT DOCUMENTS

| | | | |
|---|---|---|---|
| 3,322,154 A * | 5/1967 | Mercier | 138/30 |
| 3,459,003 A | 8/1969 | O'Neal | |
| 3,741,250 A * | 6/1973 | Mercier | 138/30 |
| 3,937,599 A * | 2/1976 | Thureau et al. | 417/389 |
| 4,523,901 A * | 6/1985 | Schippers et al. | 417/395 |
| 4,610,369 A * | 9/1986 | Mercier | 220/721 |
| 4,991,998 A * | 2/1991 | Kamino et al. | 405/130 |
| 6,033,192 A * | 3/2000 | Wood | 417/395 |
| 7,093,651 B2 * | 8/2006 | Meyers et al. | 166/85.2 |
| 2003/0173143 A1 | 9/2003 | West | |
| 2006/0196820 A1 * | 9/2006 | Duby | 210/408 |

FOREIGN PATENT DOCUMENTS

DE      3420658      7/1985

OTHER PUBLICATIONS

International Search Report from International Application PCT/ZA2009/000088, dated Apr. 15, 2010, 2 pages.

* cited by examiner

*Primary Examiner* — Christopher Jetton
*Assistant Examiner* — Paul Thiede
(74) *Attorney, Agent, or Firm* — Michael Best & Friedrich LLP (57) ABSTRACT

An electrical energy generating system in which high pressure slurry is used to expel water, alternately from two bladders, which is used to power a turbine which drives a generator.

15 Claims, 6 Drawing Sheets

ENERGY GENERATION SYSTEM INCLUDING PRESSURE VESSELS WITH FLEXIBLE BLADDERS HAVING ELONGATE VALVE TUBES CONTAINED THEREIN THAT CONTAIN A PLURALITY OF FLOW APERTURES FOR COMMUNICATION OF FLUID THEREWITH

CROSS-REFERENCE TO RELATED APPLICATIONS

This application is a 35 U.S.C. §371 filing of International Patent Application No. PCT/ZA2009/00088 filed Oct. 7, 2009 the entire contents of which is herein incorporated by reference.

BACKGROUND OF THE INVENTION

This invention relates generally to the recovery of energy from a slurry source which has substantial potential energy due to the elevation of the source above a working point and, more particularly, is concerned with the conversion of such potential energy into electrical energy.

In certain mining operations a metal-bearing ore is mined, crushed and milled at a mine site. Thereafter processed water is added to the milled product to produce a slurry at a predetermined specific gravity.

In a mountainous region such as Chile mining often takes place at a high altitude. The slurry which is produced at the mine site is then fed under gravity action via a pipeline to a process plant, at a relatively low altitude, at which minerals are extracted from the slurry.

In one mining operation known to the applicant the pipeline has a diameter of about 600 mm and has a length of the order of 50 kilometers. The difference between the heights of the mining site and the process plant is approximately 2500 meters. The substantial static hydraulic head coupled with the specific gravity of the slurry mean that the pressure at a discharge end of the pipeline can be as high as 400 bar. A pressure of this order is technically difficult to handle and constitutes a considerable potential danger. To obviate difficulties of this nature the slurry is passed through a series of pressure reducing or choke stations, at suitable intervals along its length, and at each station energy in the slurry is dissipated.

At the process plant the slurry is subjected to a solid/liquid separation step. The recovered solids undergo further processing for mineral recovery and the liquid, which essentially is clear process water, is pumped to the elevated mine site for reuse. The consumption of electrical energy in pumping the water to a height of about 2500 meters is considerable.

An object of the present invention is to provide a system which makes use of the potential energy in a slurry pipeline to generate electrical energy, which in part offsets the amount of energy required to pump the process water back up to the mine.

SUMMARY OF THE INVENTION

The invention provides a system for generating energy which includes:
(a) an energy storage or generating arrangement;
(b) first and second pressure vessel assemblies, wherein each pressure vessel assembly respectively includes:
 (i) a pressure vessel with an upper end with a water port, and a lower end with a slurry port, and
 (ii) a flexible bladder, inside the pressure vessel, with a mouth which is in communication with the water port and which, on an outer side, is sealingly engaged with the pressure vessel, the bladder defining a slurry volume of variable size between an outer surface of the bladder and an inner surface of the pressure vessel,
(c) a water manifold, which includes water manifold valves, connected to the water ports of the pressure vessels,
(d) a water pump and pressure accumulator arrangement including pressurising and depressurising valves, for providing water in a controlled manner, under pressure alternately to the bladders of the pressure vessel assemblies,
(e) a slurry manifold, which includes slurry manifold valves, which is connected to the slurry ports of the pressure vessels and which is connectable to a pressurised source of slurry, and
(f) a controller which regulates operation of, at least, the pressurizing and depressurising valves, the water manifold valves and the slurry manifold valves so that slurry flows through the slurry manifold into at least the slurry volume of the first pressure vessel assembly to collapse the bladder of the first pressure vessel and expel water from the bladder through the water manifold thereby to produce a source of pressurised water which is directed to the energy storage or generating arrangement, while water from a water source passes through the water manifold into the bladder of the second pressure vessel assembly thereby to expand the bladder allowing slurry from the associated slurry volume, to flow through the slurry manifold, to a slurry collection location.

Preferably each pressure vessel assembly includes a respective sensor for detecting elongation of the bladder, inside the pressure vessel, beyond a predetermined position, the sensor comprising an elongate member with a lower end which is fixed to a lower end of the bladder, and a switch which upon movement of the elongate member from a predetermined position transmits a signal to the controller.

Preferably the water flows, under gravity, from the water source, which may be an elevated storage tank, into the bladder of the second pressure vessel.

Preferably slurry flow, to the slurry collection location, is due to gravity action.

In one embodiment each pressure vessel assembly respectively includes an elongate valve tube which extends inside the bladder and which has a plurality of flow apertures at respective locations along its length, an upper end, through which is formed a flow passage and which is located within and, externally, is in sealing engagement with, the mouth of the bladder, and a lower end.

During operation of the system as slurry flows into the associated slurry volume, the bladder of the first pressure vessel assembly is caused to collapse from the lower end of the bladder towards the upper end of the bladder so that the flow apertures in the valve tube are closed successively from the lower end to the upper end of the valve tube.

The invention also provides a method of generating energy which includes the steps of:
(a) in a controlled way, directing slurry flow from a pressurised source into a first pressure vessel,
(b) using the slurry flow into the first pressure vessel to collapse a bladder, inside the first pressure vessel, thereby to expel water under pressure from the bladder,
(c) directing the expelled pressurised water to an energy storage or generating arrangement, (d) during at least part of steps (b) and (c) allowing water to flow into a bladder, in a second pressure vessel, to expand the bladder and thereby allow slurry to flow from the second pressure vessel, and (e) repeating steps (a) to (c) for the second pressure vessel, and step (d) for the first pressure vessel.

In step (d) the water flow may be in the nature of drainage under gravity action, from a water source into the bladder. Similarly, the slurry may drain under gravity action from the second pressure vessel.

The invention also provides a bladder for use in the energy generating system of the invention which includes an elongate cylindrical body which is made from an elastically deformable material with a substantially hemispherical lower end, a substantially hemispherical upper end, and a tubular mouth at the upper end which includes a circumferentially extending seal formation.

BRIEF DESCRIPTION OF THE DRAWINGS

The invention is further described by way of example with reference to the accompanying drawings in which.

DESCRIPTION OF PREFERRED EMBODIMENT

Figure 1:
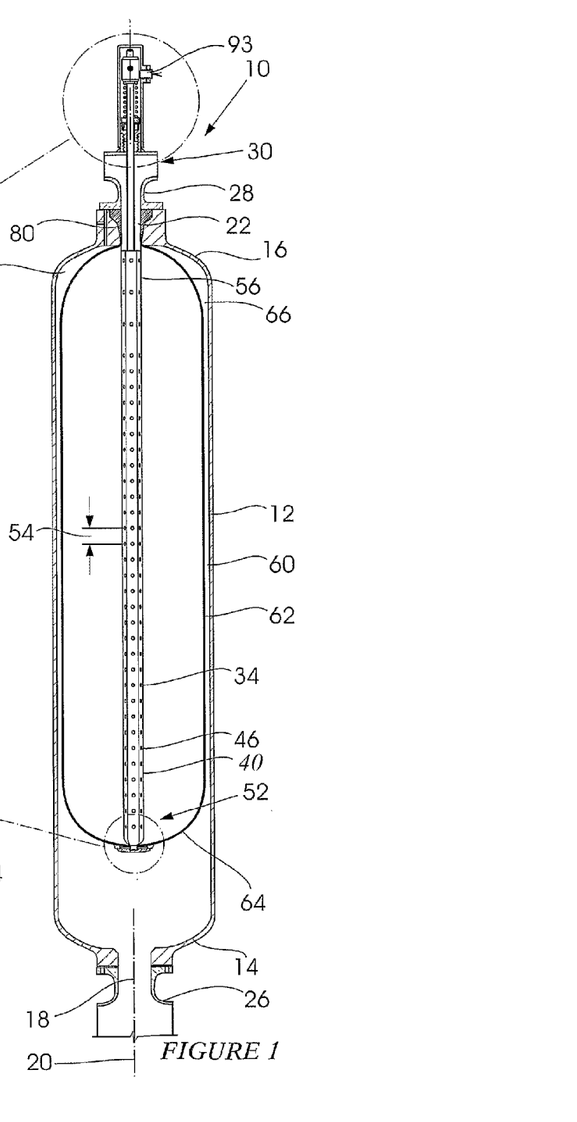
FIG. 1 is a side view in section of a pressure vessel assembly which is used in the system of the invention.

FIG. 1 of the accompanying drawings is a side view in cross section of a pressure vessel assembly 10 which is used in an electrical energy generating system according to the invention.

The assembly includes an elongate, cylindrical pressure vessel 12 which is made from suitable steel with a lower, substantially hemispherical end 14 and an upper, substantially hemispherical end 16.

A slurry port 18 is positioned at the lower end 14 centred on a longitudinal axis 20 of the vessel. A water port 22, also centred on the longitudinal axis, is positioned at the upper end 16. The water port 22 is for a driven fluid i.e. water which is pressurised in a bladder in the vessel and which is used to extract energy from the assembly. The slurry port 18 is for a driving fluid i.e. slurry under pressure which inputs energy into the assembly.

The slurry port 18 is connected via a suitable coupling, not shown, to a slurry manifold 26 which is described in greater detail hereinafter with particular reference to FIG. 9. The water port 22 is connected via a suitable connector 28 to a water manifold 30 which is also described hereinafter in greater detail with particular reference to FIG. 9.

Figure 4:
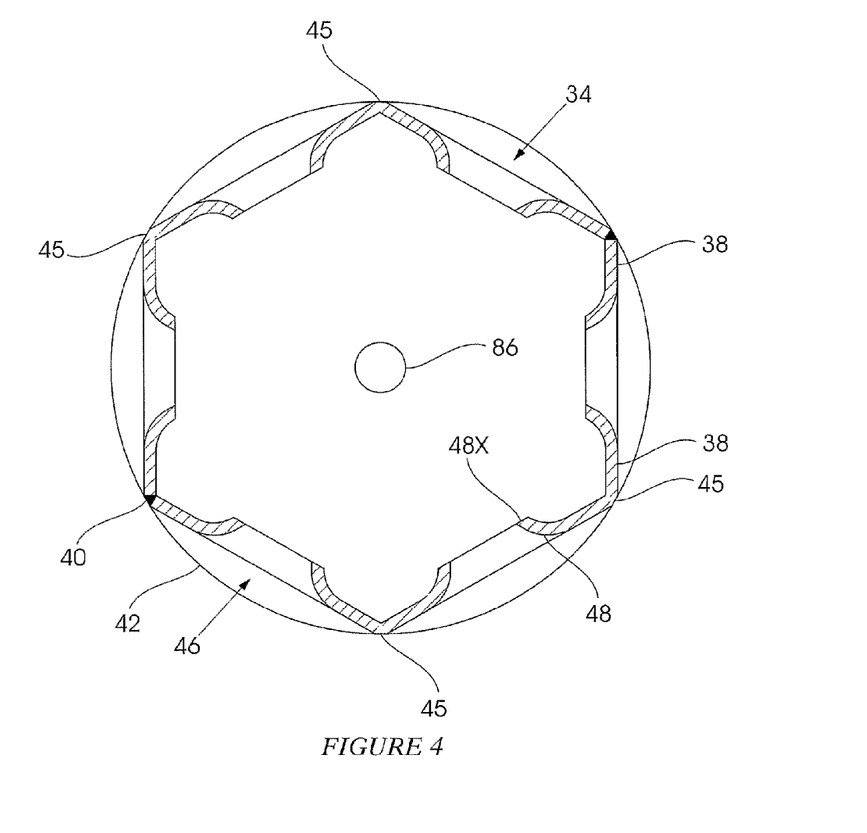
FIG. 4 is a cross-sectional view in plan of a valve tube included in the assembly of the invention.
Figure 7:
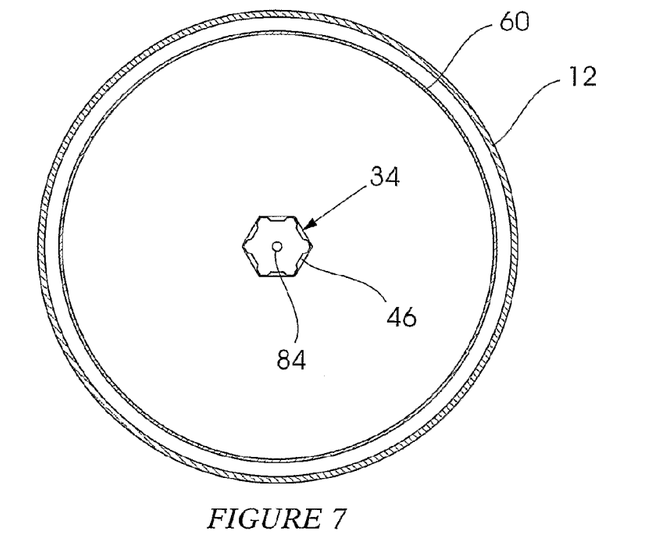
FIG. 7 is a view in cross section and in plan of a pressure vessel with an internal bladder in a relaxed state.
Figure 8:
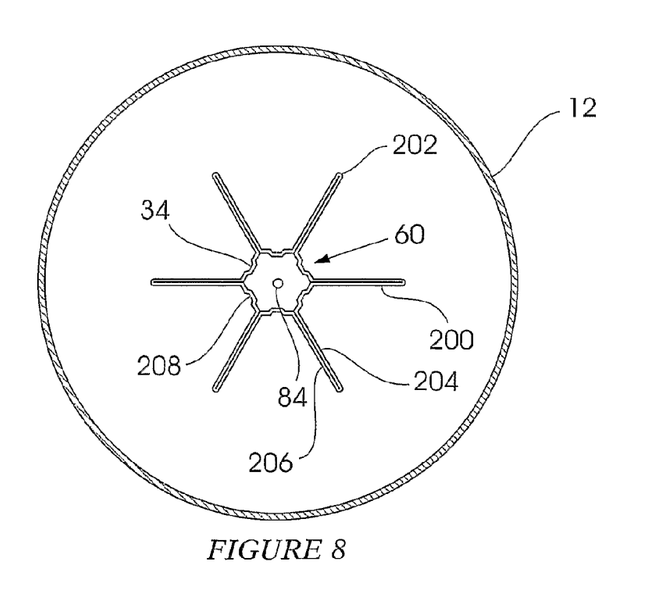
FIG. 8 is similar to FIG. 7 but showing the bladder fully collapsed.

An elongate valve tube 34, which is shown in cross section in FIGS. 7 and 8 and on an enlarged scale in FIG. 4, extends downwardly inside the pressure vessel 12. In this example of the invention the valve tube has six sides 38 which are nominally flat. The tube is constructed from two half-hexagonal components which are fabricated with longitudinal bends 45. Adjacent sides adjoin at junctions 40 which lie on a circumference 42 of a circle. A plurality of flow apertures 46 are formed in the respective sides. Each flow aperture is bounded by a respective arcuate surface 48 which extends towards an interior of the valve tube. This feature is intended to reduce the likelihood that the bladder can be damaged in the region of each flow aperture, particularly by edges 50 of the valve tube.

As is shown in FIG. 1 the apertures are centrally positioned in the respective sides and are closer to each other at a lower end 52 of the valve tube. The spacing 54 between adjacent flow apertures increases towards an upper end 56 of the valve tube. In addition, particularly near the upper end 56, the sizes of the apertures are significantly reduced. Due to the variations in aperture sizes, and spacing, the total area of the flow apertures, per unit length of the valve tube, decreases towards the upper end of the valve tube.

Figure 5:
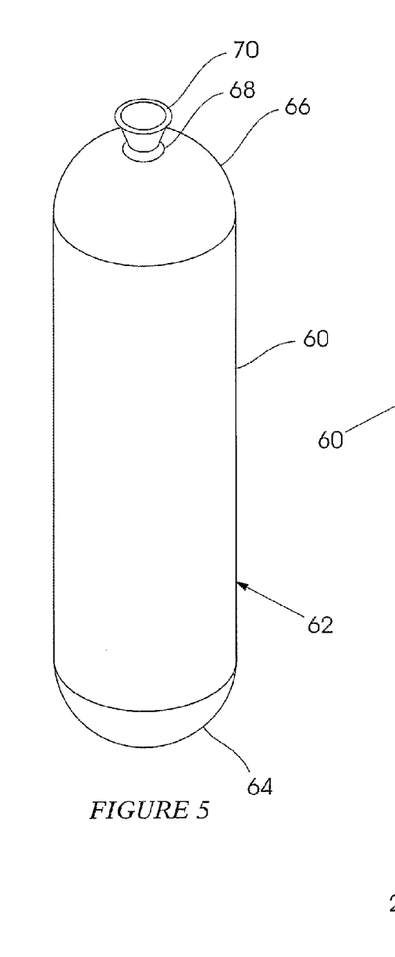
FIG. 5 is a perspective view of a bladder which is used in the assembly of FIG. 1.

A bladder 60 is positioned inside the pressure vessel and the valve tube is located inside the bladder. The bladder has an elongate body 62 which, as shown in FIGS. 5 and 7, is generally cylindrical and has a substantially hemispherical lower end 64 and a substantially hemispherical upper end 66. The bladder is made from any appropriate material e.g. rubber or any equivalent synthetic material known in the art. The invention is not limited in this regard.

Figure 3:
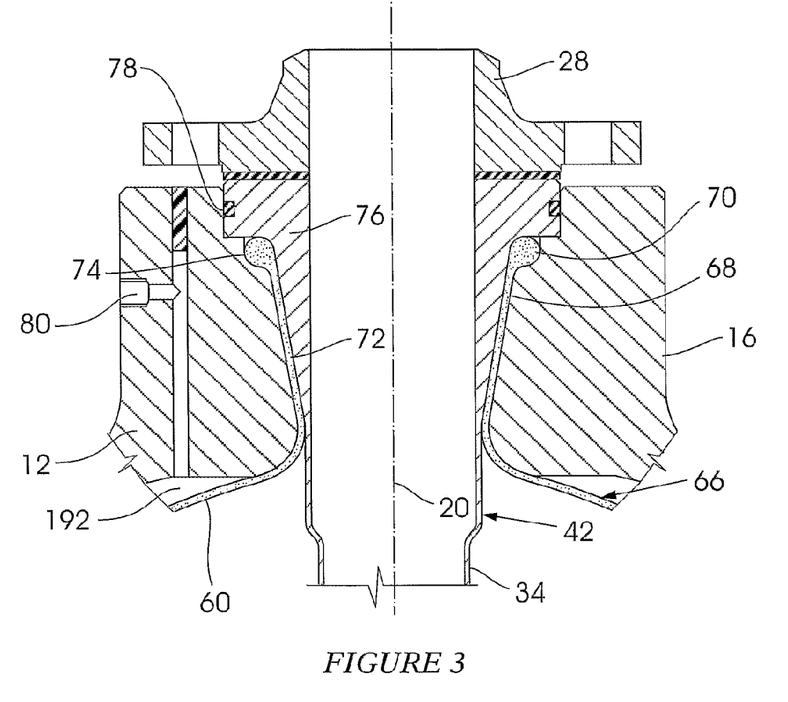
FIG. 3 is a side view in cross section on an enlarged scale of an upper end of the pressure vessel included in the assembly of FIG. 1.

FIG. 3 illustrates on an enlarged scale and in cross section a portion of the upper end 66 of the bladder. This end is formed with a tubular mouth 68 which flares outwardly slightly and which terminates in a sealing formation 70, in the nature of an O-ring seal, which is integral with the tubular mouth. The tubular mouth is positioned inside a tapered bore 72 of the pressure vessel with the O-ring formation 70 in a complementary recess 74. A tapered flange 76 which, itself, is externally sealed by means of an O-ring 78, is used to secure the tubular mouth to the tapered bore. An upper end of the tapered flange extends to the connector 28 shown in FIG. 1. An air vent valve 80 is operable to bleed air from a volume (referred to hereinafter as a slurry volume 192) between an inner surface of the pressure vessel 12 and an outer surface of the bladder 60—see FIGS. 1 and 9.

The circumference 42, referred to in connection with FIG. 4, is marked in FIG. 3. This constitutes an upper end of the valve tube 34 which extends downwardly inside the bladder and which is centred on the longitudinal axis 20 of the pressure vessel.

Figure 2:
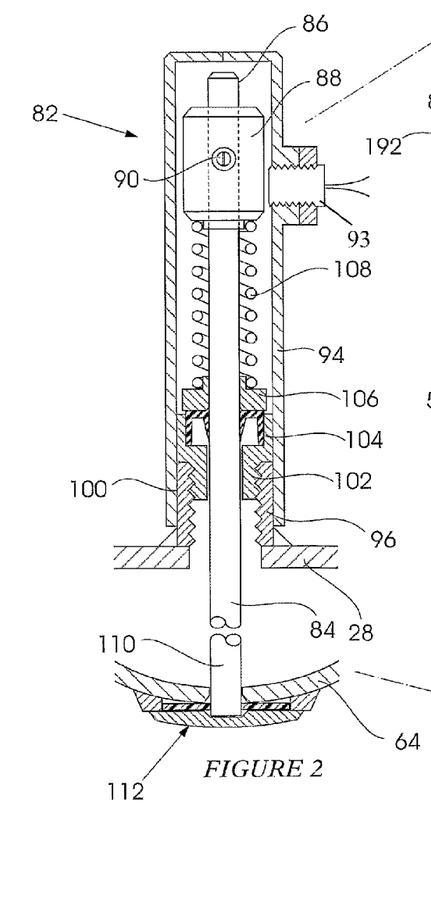
FIG. 2 shows, on an enlarged scale, a sensing arrangement used to prevent damage to a bladder of the pressure vessel assembly arising due to excessive longitudinal deformation of the bladder.

FIG. 2 illustrates additional constructional details of a sensing and switch mechanism 82 at the upper end, and at the lower end, of the bladder. An elongate member 84, e.g. a corrosion-resistant rod, e.g. of stainless steel, extends through the valve tube 34. An upper end 86 of the rod carries a switch bobbin 88 which is secured to the rod by means of a grub screw 90. A proximity switch 93 fixed to an appropriate housing 94 is used to detect movement of the bobbin. At a lower end the housing 94 is attached to a spigot 96 which projects outwardly from part of the connector 28. The housing is fixed to the spigot by means of one or more grub screws 100. A gland holder 102 carries a U-seal 104 which provides a sealing interface with an outer surface of the rod 84. A seal retainer 106 ensures that the U-seal remains in position. A spring 108 acts between the structure at the lower end of the housing and the bobbin 88.

A lower end 110 of the rod extends beyond the lower end 52 of the valve tube and is engaged with appropriate attachment structure 112 which fixes the lower end 110 at a central location to the lower hemispherical end 64 of the bladder.

Figure 9:
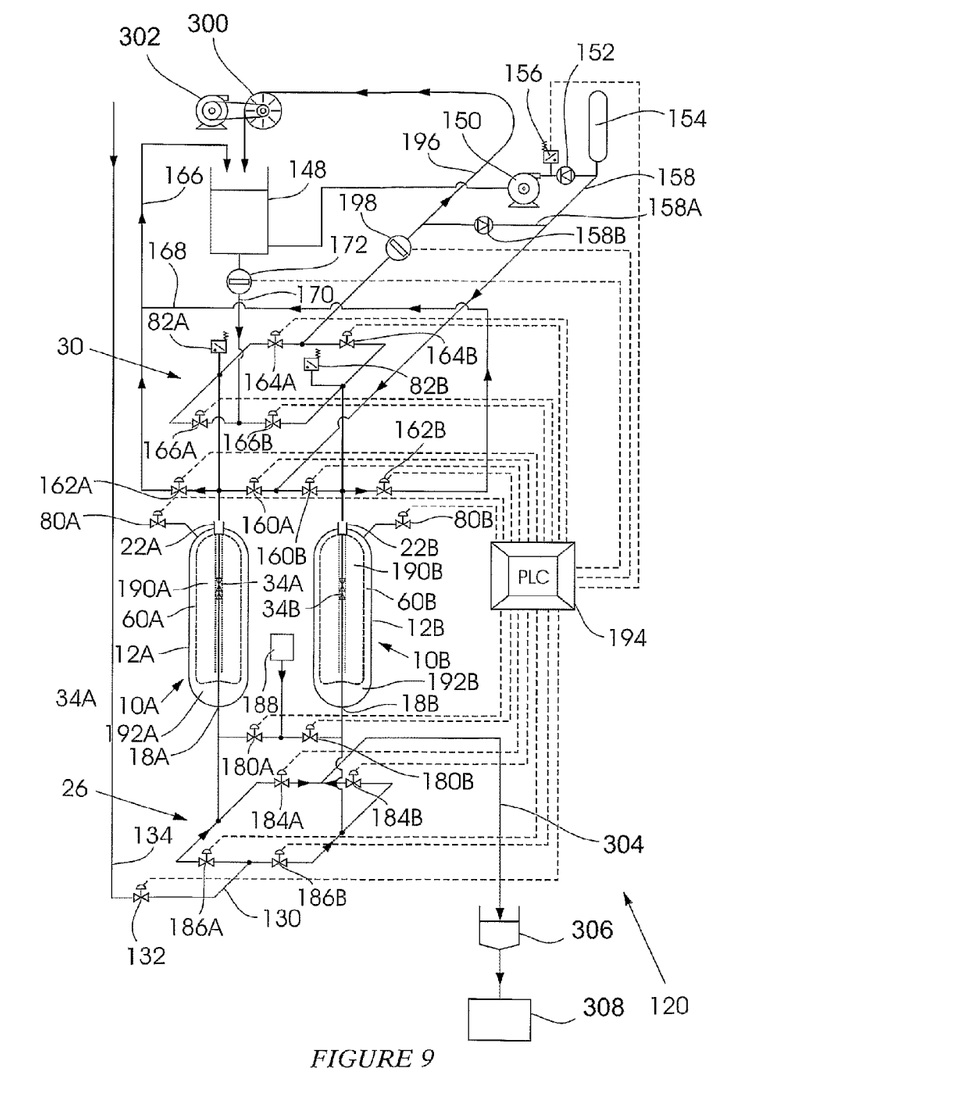
FIG. 9 is a schematic representation of an electrical energy generating system based on the use of two pressure vessel assemblies, each of the kind shown in FIG. 1.

FIG. 9 shows an electrical energy generating system 120 which is based on the use of a first pressure vessel assembly 10A and a second pressure vessel assembly 10B each of the kind shown in FIGS. 1 to 8. Where appropriate the parts in the two pressure vessel assemblies are distinguished from each other by means of the suffixes A and B.

The water ports 22A and 22B are connected to a compound water manifold 30. Similarly the slurry ports 18A and 18B are connected to a compound slurry manifold 26—the components 30 and 26 are those referred to in connection with FIG. 1. An inlet to the slurry manifold is connected by a pipe 130 through an isolator valve 132 to a slurry pipeline 134 which comes from an elevated slurry source and which directs slurry under pressure to the slurry manifold.

Clean water from a tank 148 can be pumped by means of a clean water high pressure pump 150 through a non-return valve 152 to a water pressure accumulator 154. The pump is controlled by a pressure switch 156. The non-return valve 152 sustains the pressure in the accumulator which is connected to the manifold 30 via a line 158.

The water manifold includes control pressurising valves 160A and 160B, and de-pressurizing valves 162A and 162B, water outlet valves 164A and 164B, and controlled water charge valves 166A and 166B, respectively.

Water flowing from the de-pressurizing valves 162A and 162B is returned via lines 168 to the tank 148. Water is supplied to the charge valves 166A and 166B, from the tank 148, through a line 170 via a water flow meter 172.

The switch mechanism 82 shown in FIG. 2 is notionally indicated in FIG. 9 and is designated 82A and 82B respectively for the two pressure vessel assemblies.

The slurry manifold 26 includes priming valves 180A and 180B, controlled slurry drain valves 184A and 184B, and controlled slurry charge valves 186A and 186B, respectively.

A low pressure clean water source 188 is connected to the priming valves 180A and 180B.

The interior of each bladder 60A, 60B forms a water volume 190A, 190B respectively of variable size depending on the extent of collapse of the bladder. A respective slurry volume 192A, 192B is formed inside each pressure vessel between an outer surface of the bladder and an inner surface of the pressure vessel.

A programmable logic controller 194 is connected to various components of the electrical energy generating system as is indicated by means of dotted lines.

A discharge line 196 from the water manifold directs water through a water flow meter 198 to a turbine 300 which can be driven by a high pressure jet of water. An electrical generator 302 is coupled to the turbine. The generator and turbine can be of any appropriate kind known in the art and the invention is not limited in this respect. Water exiting the turbine is discharged into the tank 148.

Slurry from the manifold 26 is drained through a pipeline 304 directly, or via an intermediate slurry storage tank 306, to a slurry discharge location 308.

At start-up of the electrical energy generating system the water tank 148 is filled with water and the slurry supply pipeline 134 is filled with slurry. The slurry isolator valve 132 is closed. The water line 196 is full beyond the water outlet valves 164A and 164B through the flow meter 198 to the turbine 200. The controller 194 ensures that all actuated valves in the system are biased to closure in a power-down situation and accordingly these valves are closed. The counts of the water meters 172 and 198 in the controller 194 are set to zero.

The controller 194 initiates a start-up sequence whenever the system is restarted after a shut down. Upon system stoppage, for whatever reason, it is not possible to ascertain the positions of the bladders 60A and 60B. Use is therefore made of water drawn from the low pressure water source 188 to drive the bladders 60A and 60B to known positions prior to commencing a start-up procedure.

The controller 194, upon receipt of a "run" signal, opens the pilot valves 162A and 162B to depressurise the vessels 10A and 10B and also opens the slurry charge valves 186A and 186B. Once depressurisation of both vessels has taken place, the valves 162A and 162B are closed and the discharge valves 164A and 164B are opened. The priming valves 180A and 180B are opened and low pressure water from the source 188 flows into the slurry volumes 192A and 192B through the respective slurry ports 18A and 18B. The low pressure water fills the manifold 26 and pipeline section 130, through the valves 186A and 186B, up to the slurry isolator valve 132. The water flowing into the volumes 192A and 192B causes the bladders 60A and 60B to collapse inwardly towards the valve tubes 34A and 34B respectively. Water which may have been in the bladders is discharged via the valves 164A and 164B, the flow meter 198 and turbine 200, to the water tank 148. This water flow ceases when all the apertures 46A and 46B in the vent tubes are blocked by the material of the respective bladders. At this point the vessels 12A and 12B are each filled with low pressure water.

The valves 164A and 164B, and 186A and 186B, are closed and the vent valves 80A and 80B are opened. Water then flows through both vent valves. This ensures that no air is trapped in the vessels. The vent valves 80A and 80B are then closed whereafter the priming valves 180A and 180B are closed. The counts of the water meters 172 and 198 in the controller 194 are reset to zero. Each water flow meter sends a pulse to the controller 194 for every 10 liters of water which passes through the meter. The controller keeps a count of the pulses and controls the operation of the valves in accordance with a prescribed sequence to produce tailored slurry and water flows, to and from the pressure vessel assemblies, to ensure that no abrupt pressure variations take place in the slurry and water flows.

The slurry drain valve 184A and the water charge valve 166A are opened simultaneously. Water from the slurry volume 192A is directed to the slurry discharge location 208. Water from the tank 148 flows into the water volume 190A until the limit switch 82A senses downward movement of a lower end of the bladder 60A. The water meter 172 monitors the water flow and confirms that the correct water volume has been charged into the bladder 60A. The valves 166A and 184A are then simultaneously closed.

The count of the water meter 172 in the controller 194 reset to zero and the water volume 192B is charged in a similar way.

Assume that each vessel 12A, 12B has an internal volume of 400 liters and that each bladder 60A, 60B has an unstretched maximum volume of 350 liters. At this point therefore each bladder contains 350 liters of water. Water also fills the remaining volume of each vessel and the components between each slurry port 18A, 18B and the isolator valve 132. The valves 184A, 184B and 186A, 186B are closed.

The valve 186B is then opened and immediately thereafter the pilot valve 160B is opened. Water can then flow from the accumulator 154 via the line 158 into the bladder 60B. The bladder is thereby pressurised. Also pressurised are the components between the bladder and the valve 132 i.e. the pipe from the valve 184B through the valve 186B to the valve 186A and the line 130.

The valve 186B is then closed and the valve 132 is opened. The system is now primed and ready to start.

Once a "start" signal is generated by the controller 194 the valves 186B and 164B are opened simultaneously Slurry can then flow from the supply pipeline 134 into the slurry volume 192B. The bladder 60B is collapsed towards the valve tube 34B. The water contained inside the bladder is displaced via the manifold 30, the discharge valve 164B and the water meter 198, through the line 196. The water exits the line 196 at a high pressure, in one or more jets which impinge on the turbine 200. The turbine is thus rotated and the generator 202 is driven. Electrical energy produced by the generator can be used in any appropriate way. For example the electrical energy can be used to pump water, separated from the incoming slurry flow, back to a mine site. Alternatively or additionally the electrical energy can be sold to a utility or used, as required, at the generation site.

The count of the water meter 198 in the controller which was reset to zero is now advanced by a pulse for every 10 liters of water flow through the meter.

As the slurry continues to flow into the active pressure vessel assembly the water from the respective bladder is displaced and drives the turbine before being discharged to the tank 148. The controller monitors the pulses from the meter 198.

When pulse 28 is reached i.e. when 280 liters have been discharged, the controller opens the pilot valve 160A which pressurises the vessel 12A in readiness for a changeover sequence. Upon pulse 30 the controller instructs the valves 186A and 164A to open, and the valves 186B and 164B to close, simultaneously. At this point the bladder, which started the cycle containing 350 liters, and has discharged 300 liters (giving rise to a corresponding pulse count of 30), therefore retains a volume of 50 liters, which is hydraulically locked into the bladder by the discharge valve 164B. The pilot valve 160B is also closed and the count of the water meter 198 in the controller is reset to zero. This 50 liter volume of water acts as a buffer which prevents the bladder skin material from closing all the holes in the valve tube. If this were to happen, i.e. if the bladder material closed all the valve tube holes, the substantial pressure differential which exists between the high pressure slurry and low pressure water (or atmosphere), would force the bladder material into the holes. The bladder material would then stretch and rupture, resulting in failure of the system.

The aforementioned sequence means that there is a smooth diversion of the flow of slurry from one slurry volume to the other. Consequently a smooth diversion of water flow from one bladder to the other is achieved and abrupt variations in the water flow rate to the turbine are avoided.

Once the controller confirms that the valves 186A and 186B as well as valves 164A and 164B have changed state the depressurising valve 162B is opened and after a few seconds the valves 166B and 184B are also opened. This allows water from the tank 148 to flow via the water meter 172 into the bladder 60B while the slurry in the volume 192B drains via the line 204 to the slurry discharge location.

The water meter 172 sends a pulse to the controller for every 10 liters of water flow. The water count of this meter was set to zero and the controller counts the pulses. The pulse count is compared to the operation of the limit switch 82B. The controller confirms that 30 pulses have been reported and thereupon the valves 184B and 166B are simultaneously closed. The pilot valve 160B is opened to pressurise the bladder 60B in readiness for the changeover which occurs when the water meter 198 has counted 30 pulses i.e. when the predetermined volume of water has flowed from the bladder 60A.

The aforementioned sequence runs continuously. The volume of water which is directed to the turbine is the same as the volume of slurry discharged into the slurry discharge location. However the slurry's energy is used to pressurise the water which, in turn, is used to generate electricity.

The water in the tank 148 requires no replenishment except for evaporation or similar extraneous losses and is continuously circulated through the system, serving as an energy transfer medium.

The system is designed so that the time taken to charge one of the bladders with water is shorter than the time taken to discharge water from the other bladder to the turbine. The time overlap provides a window in which a vessel can be pre-pressurised in order to achieve a smooth high pressure transition of slurry flow from one vessel to the other vessel.

During operation of the system, as a bladder collapses it deforms inwardly towards the centrally located valve tube. The slurry is denser than the water. Thus the slurry starts to deform the lower hemispherical end of the bladder inwardly initially to form a plurality of radially spaced pleats 200 (see FIG. 8) which close upon themselves as the bladder material between apices 202 of the pleats migrates towards the closest flow apertures 46 in the valve tube 34. Each pleat comprises opposed sections 204 and 206 of bladder material. These pleats radiate from a centrally positioned core 208 of the bladder which is in intimate contact with, and which is thereby defined in shape by, a centrally positioned portion of the valve tube.

Figure 6:
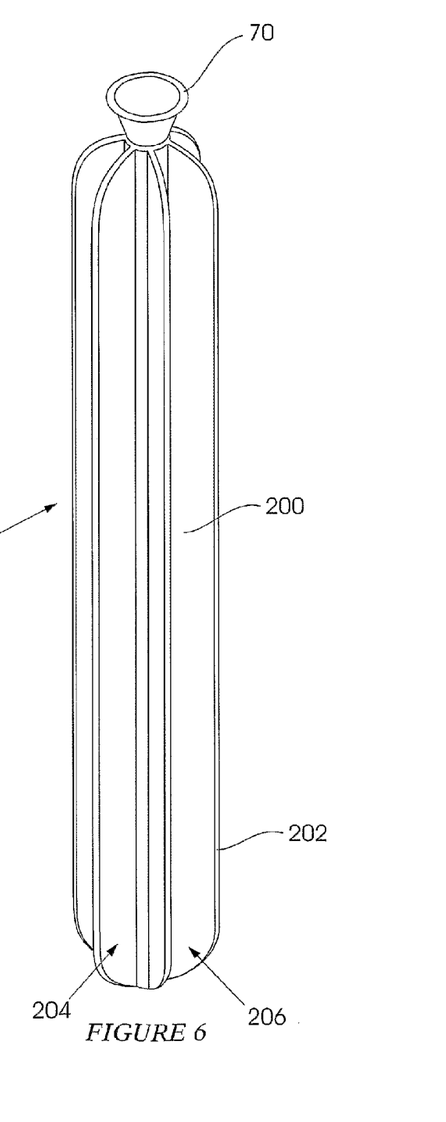
FIG. 6 shows the bladder when it is fully collapsed around the valve tube of FIG. 4.

The pleats continue to form vertically from the bottom of the bladder upwardly and the flow apertures in the valve tube are sequentially closed by the bladder material as the level of the slurry rises in the slurry volume. Ultimately the upper hemispherical portion of the bladder is reached whereupon the pleats terminate in a mirrored fashion to the pleats in the lower hemispherical portion of the bladder as is shown in FIG. 6. This controlled collapse of the bladder is dependent, at least, on the external shape of the valve tube. In order to guide the bladder as it deforms and to prevent damage to the bladder material it is desirable thus for the valve tube to have the nominally flat outer surfaces 38 with the apices 40 between adjacent surfaces. These structural features help in the formation of the bladder shape as it collapses. Also the flow passages 46 have surrounding arcuate side walls 48 which extend inwardly towards an interior of the valve tube with inner edges 48X well set back so that the likelihood of bladder damage arising when the bladder has been fully collapsed and bears hard against the valve tube, is much reduced.

The switch mechanism 82 has significant importance. Although the bladder is filled with water under gravity action there is a small possibility that under abnormal circumstances the bladder could be over-pressurised. The bladder is made from a highly elastic material and this can be elongated by a factor of up to 8. The slurry which enters the slurry volume is at a high pressure and it is also important to prevent the bladder material from coming into contact with the valve tube. If this were to take place, as explained elsewhere in the specification, the bladder material could be extruded through the valve ports. This aspect is addressed by ensuring that a cushion volume of water of about 50 liters is retained in each bladder at the end of a water discharge cycle. This prevents the bladder material from directly contacting the valve tube.

The switch mechanism, working in conjunction with the water meters, provides a reset process which serves as a reference to the water meter count. When the bladder is filled with water, say to 350 liters, the bladder is expanded to a maximum extent and the switch mechanism is displaced from a reference point. A switching action which ensues is used to signal the water meters and the controller that a maximum volume of 350 liters of water has accumulated in the bladder. During a water discharge cycle the respective water meter monitors the water which is discharged and produces a count which is logged in the controller. In order to obtain a reserve volume of 50 liters of water, for the reasons which have been described, when a count of 30 has been generated by the water meter concerned the controller is notified that 300 liters have been discharged. Due to variations, measuring rates and so on it is quite possible for the actual volume of water which has been discharged to be, say, 299 or 301 liters. This small error is not important. What is of importance is the retention of a reserve volume in the bladder at the end of a water discharge cycle.

Thereafter when the bladder is expanded as water flows under gravity action into the bladder although a water meter keeps count of the volume of water entering the bladder the switch mechanism is again triggered at a predetermined point and a resetting function takes place. The value of this approach lies in the fact that it is not possible for errors to accumulate in the system for with each expansion of the bladder a reset point is achieved and the water discharge count from that point and the subsequent water recharging count are referenced to the switching point.

Apart from the aforementioned referencing action the switch mechanism ensures that the bladder is not unduly extended in a longitudinal direction. When the bladder is inflated it expands radially and longitudinally. Clearly radial expansion is limited due to the pressure vessel. Longitudinal expansion is inhibited by the volume of water which is introduced into the bladder but, in any event, as noted, there is an overriding control function exerted by the switch mechanism.

the rod 84 which is embodied in the switch mechanism has one end attached to a central position of the lower hemispherical end of the bladder. This end is movable downwardly inside the housing 94 against the bias of the spring 108. Resulting movement of the switch bobbin 88, attached to the upper end of the rod is detected by the sensor 92. This is used to signal complete filling of the bladder. However if an extreme position were to be reached, which is not sustainable, an alarm signal is directed to the controller 194 which stops functioning of all components of the generating system. All valves then revert automatically to closed positions.

The pressure accumulator 154 is pressurised by the pump 150 so that water can be supplied under pressure through the line 158 to the water manifold. In a modification the water pump is used, only initially, to pressurise the accumulator. Thereafter, when the system is operative, the accumulator is pressurised by a connection 158A, through a non-return valve 158B, made to the discharge line 196.

The capacity of the system is readily increased by extending the length of each pressure vessel, which is comparatively inexpensive, as opposed to increasing the diameter of a vessel, which is expensive. Each pressure vessel is of integral welded construction and connecting flanges are not required. The upper opening in the vessel is dimensioned so that the bladder and valve tube can be located inside the vessel by being passed through the opening, at the upper end, to which the flange 76 is fixed.

In a simplified variation of the invention, instead of passing the water displaced from the bladder, by the slurry under pressure, through a turbine to absorb the energy, the water is directed to a storage vessel at a location at an elevation at least equivalent to that of the source of the slurry driving it i.e. the energy which is generated is stored as potential energy which can be used later, when required, using any suitable technique.

What is claimed is:

1. A system for generating energy which comprises:
   (a) an energy storage or generating arrangement;
   (b) a controller;
   (c) a first pressure vessel assembly and a second pressure vessel assembly, wherein the first pressure vessel assembly and the second pressure vessel assembly each respectively include:
      (i) a pressure vessel with an upper end with a water port and a lower end with a slurry port,
      (ii) a flexible bladder disposed inside the pressure vessel, the flexible bladder including an upper end and an opposed lower end, the upper end including a mouth which is in communication with the water port and which has an outer side that is sealingly engaged with the upper end of the pressure vessel, the flexible bladder defining a slurry volume of variable size between an outer surface of the flexible bladder and an inner surface of the pressure vessel,
      (iii) an elongate valve tube including an upper end and a lower end, the elongate valve tube being disposed within an interior of the flexible bladder, the elongate valve tube defining a passage therethrough and a plurality of flow apertures in communication with the passage that are disposed along a length of the elongate valve tube, the upper end being in sealing engagement with the mouth of the flexible bladder so that the interior of the flexible bladder is in communication with the water port of the pressure vessel through the plurality of flow apertures and the passage of the elongate valve tube, and
      (iv) a sensing and switch mechanism for detecting elongation of the flexible bladder and comprising an elongate member and a switch, the sensing and switch mechanism positioned external to the pressure vessel with a lower end of the elongate member being fixedly attached to the lower end of the flexible bladder, and the switch operable to send a signal to the controller upon movement of the elongate member to a location beyond a predetermined position in the pressure vessel,
   (d) a compound water manifold including water manifold valves, wherein the compound water manifold is connected to the water port of the first pressure vessel assembly and the second pressure vessel assembly,
   (e) a water pump and pressure accumulator arrangement including pressurising and de-pressurising valves for providing water under pressure alternately to the flexible bladders of the respective first pressure vessel assembly and the second pressure vessel assembly, and
   (f) a compound slurry manifold including slurry manifold valves, wherein the compound slurry manifold is connected to the slurry port of the respective first pressure vessel assembly and to the slurry port of the second pressure vessel assembly and which is connectable to a pressurised source of slurry,
   wherein the controller regulates operation of at least the pressurising valves and the de-pressurising valves, the water manifold valves, and the slurry manifold valves during operation of the first pressure vessel assembly and operation of the second pressure vessel assembly so that:

the operation of the first pressure vessel assembly occurs so that the slurry flows through the compound slurry manifold into at least the slurry volume of the first pressure vessel assembly to collapse the flexible bladder of the first pressure vessel assembly radially inwardly toward the elongate valve tube of the first pressure vessel assembly initially from the lower end of the flexible bladder and then upwardly to the upper end of the flexible bladder so that water is expelled from the interior of the flexible bladder of the first pressure vessel assembly through the plurality of flow apertures, wherein the flow apertures are sequentially closed by the flexible bladder as the slurry rises in the slurry manifold, and the passage of the elongate valve tube of the first pressure vessel assembly in to the compound water manifold of the first pressure vessel assembly via the water port of the first pressure vessel assembly to thereby produce a source of pressurised water which is directed to the energy storage or generating arrangement, the operation of the second pressure vessel assembly occurs so that water from a water source passes through the compound water manifold of the second pressure vessel assembly via the passage and the plurality of flow apertures of the elongate valve tube of the second pressure vessel assembly in to the interior of the flexible bladder of the second pressure vessel assembly to thereby expand the flexible bladder of the second pressure vessel assembly radially outward from the elongate valve tube of the second pressure vessel assembly so that the slurry disposed in the slurry volume of the flexible bladder of the second pressure vessel assembly flows through the compound slurry manifold of the second pressure vessel assembly to a slurry collection location, and wherein the regulating operation of the controller occurs in a manner such that the operation of the first pressure vessel assembly at least overlaps a portion of the operation of the second pressure assembly.

2. The system according to claim 1 in which the energy storage or generating arrangement includes one of the following:

(a) a water storage vessel, at an elevated location, into which the pressurised water is directed; and (b) a turbine, which is powered by the pressurised water, and which drives an electrical generator.

3. The system according to claim 1 wherein the sensing and switch mechanism of at least one of the first pressure vessel assembly and the second pressure vessel assembly detects expansion of the flexible bladder of at least one of the first pressure vessel assembly and the second pressure vessel assembly to a maximum volume and then sends a signal to the controller that a maximum volume of water is in the flexible bladder of at least one of the first pressure vessel assembly and the second pressure vessel assembly.

4. The system of claim 1 wherein the flexible bladder of the first pressure vessel assembly and the flexible bladder of the second pressure vessel assembly, respectively, includes an elongate cylindrical body which is made from an elastically deformable material with a substantially hemispherical lower end, a substantially hemispherical upper end, and the mouth of the flexible bladder of the first pressure vessel assembly and the flexible bladder of the second pressure vessel assembly, respectively, is a tubular mouth positioned at the upper end of the flexible bladder and includes a circumferentially extending seal formation.

5. The system according to claim 1, wherein the first pressure vessel assembly includes the corresponding elongate member of the corresponding sensing and switch mechanism extending inside the corresponding elongate valve tube, and the second pressure vessel assembly includes the corresponding elongate member of the corresponding sensing and switch mechanism extending inside the corresponding elongate valve tube.

6. The system according to claim 1, wherein the first pressure vessel assembly includes a first longitudinal axis disposed along the length of the corresponding elongate valve tube and said movement of the corresponding elongate member is axial movement along the first longitudinal axis, and the second pressure vessel assembly includes a second longitudinal axis disposed along the length of the corresponding elongate valve tube and the movement of the corresponding elongate member is axial movement along the second longitudinal axis.

7. The system according to claim 1, wherein said fixedly attached end of the elongate member has an opposed, axial spaced relationship from the mouth of the flexible bladder in at least one of the first pressure vessel assembly and the second pressure vessel assembly.

8. The system according to claim 1, wherein the sensing and switch mechanism associated with the first pressure vessel assembly further includes a first bobbin and a first spring in which the first bobbin and the first spring and the switch associated with the first pressure vessel assembly are disposed external to the flexible bladder of the first pressure vessel assembly, and the first bobbin and the first spring are in communication with the elongate member of the first pressure vessel assembly.

9. The system according to claim 8, wherein the sensing and switch mechanism associated with the second pressure vessel assembly further includes a second bobbin and a second spring in which the second bobbin and the second spring and the switch associated with the second pressure vessel assembly are disposed external to the flexible bladder of the second pressure vessel assembly, and the second bobbin and the second spring are in communication with the elongate member of the second pressure vessel assembly.

10. The system according to claim 9, wherein the first bobbin and the first spring and the switch associated with the first pressure vessel assembly are disposed external to the pressure vessel of the first pressure vessel assembly and are received in a housing along with a portion of the elongate member associated with the first pressure vessel assembly, said housing being disposed proximate the mouth of the flexible bladder of the first pressure vessel assembly.

11. The system according to claim 10, wherein the second bobbin and the second spring and the switch associated with the second pressure vessel assembly are disposed external to the pressure vessel of the second pressure vessel assembly and are received in a housing along with a portion of the elongate member associated with the second pressure vessel assembly, said housing being disposed proximate the mouth of the flexible bladder of the second pressure vessel assembly.

12. The system according to claim 1, wherein after the flexible bladder of the pressure vessel of the first pressure vessel assembly is collapsed, the collapsed flexible bladder of the first pressure vessel assembly comprises a plurality of radially spaced pleats that surround the elongate valve tube of the flexible bladder of the first pressure vessel assembly.

13. A method of generating energy comprising:
(a) directing slurry flow via operation of a controller from a pressurised source into a first pressure vessel,
(b) collapsing a first flexible bladder in the first pressure vessel with the received slurry flow, the first flexible bladder including an upper end and a lower end,
(c) expelling pressurised water from the first flexible bladder in response to the step of collapsing the first flexible bladder, wherein the pressurised water is expelled from the first flexible bladder through a first plurality of apertures in a first elongate valve tube positioned within the first flexible bladder, and then through a passage of the first elongate valve tube and then out of a first water port of the first pressure vessel, wherein the step of collapsing the first flexible bladder further includes the first flexible bladder being collapsed radially inwardly toward the first elongate valve tube,
(d) while collapsing the first flexible bladder and expelling water from the first flexible bladder, allowing water to flow through a second water port of a second pressure vessel and into a second flexible bladder in a second pressure vessel through a second elongate valve tube positioned within the second flexible bladder, the water flowing from the second water port through a passage of the second elongate valve tube and on through a second plurality of flow apertures in the second elongate valve tube so as to expand the second flexible bladder in a radial direction outwardly away from the second elongate valve tube, the second flexible bladder including an upper end and a lower end,
(e) while the step of allowing water to flow into the second flexible bladder occurs, allowing slurry to flow out of the second pressure vessel,
(f) expanding the second flexible bladder in response to the step of allowing water to flow into the second flexible bladder so that slurry flows out of the second pressure vessel,
(g) using a first sensing and switch mechanism that includes a first bobbin and a first switch, the first sensing and switch mechanism of the first pressure vessel being used to detect elongation of the first flexible bladder beyond a predetermined location within the first pressure vessel by detecting movement of the first bobbin relative to the first switch, the first bobbin mounted to an upper end of a first elongate member, and
(h) using a second sensing and switch mechanism that includes a second bobbin and a second switch, the second sensing and switch mechanism of the second pressure vessel being used to detect elongation of the second flexible bladder beyond a predetermined location within the second pressure vessel by detecting movement of the second bobbin relative to the second switch, the second bobbin mounted to an upper end of a second elongate member.

14. The method according to claim 13 wherein, in step (d), water flows under gravity action from a water source, via the second elongate valve tube into the second flexible bladder, and the slurry drains under gravity action from the second pressure vessel.

15. The method according to claim 13 further comprising directing the pressurised water expelled from the first flexible bladder to:
(i) an elevated water storage vessel, or
(ii) an arrangement which includes a turbine which is powered by the pressurised water to drive an electrical generator.

* * * * *